United States Patent
Xu et al.

(10) Patent No.: US 11,870,983 B2
(45) Date of Patent: Jan. 9, 2024

(54) DEBLOCKING FILTERING

(71) Applicant: Google LLC, Mountain View, CA (US)

(72) Inventors: Yaowu Xu, Saratoga, CA (US); Jingning Han, Santa Clara, CA (US); Cheng Chen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 45 days.

(21) Appl. No.: 16/995,078

(22) Filed: Aug. 17, 2020

(65) Prior Publication Data

US 2020/0382776 A1  Dec. 3, 2020

Related U.S. Application Data

(63) Continuation of application No. 16/016,768, filed on Jun. 25, 2018, now Pat. No. 10,750,171.

(51) Int. Cl.
*H04N 19/186* (2014.01)
*H04N 19/117* (2014.01)
*H04N 19/46* (2014.01)
*H04N 19/176* (2014.01)

(52) U.S. Cl.
CPC ......... *H04N 19/117* (2014.11); *H04N 19/176* (2014.11); *H04N 19/186* (2014.11); *H04N 19/46* (2014.11)

(58) Field of Classification Search
CPC .. H04N 19/117; H04N 19/176; H04N 19/186; H04N 19/46
See application file for complete search history.

(56) References Cited

U.S. PATENT DOCUMENTS

| | | | | |
|---|---|---|---|---|
| 2005/0013363 A1* | 1/2005 | Cho | ............... | H04N 19/105 375/E7.133 |
| 2005/0276496 A1* | 12/2005 | Molgaard | ............ | H04N 19/105 375/E7.265 |
| 2009/0304086 A1* | 12/2009 | Shi | .................. | H04N 19/86 375/E7.026 |
| 2011/0170609 A1* | 7/2011 | Lainema | .............. | H04N 19/117 375/E7.2 |
| 2015/0016550 A1* | 1/2015 | Kim | .................. | H04N 19/86 375/240.29 |

OTHER PUBLICATIONS

Bankoski, et al., "Technical Overview of VP8, an Open Source Video Codec for the Web", Jul. 11, 2011, 6 pp.

(Continued)

*Primary Examiner* — Dave Czekaj
*Assistant Examiner* — Berteau Joisil
(74) *Attorney, Agent, or Firm* — Young Basile Hanlon & MacFarlane, P.C.

(57) ABSTRACT

Techniques for encoding and decoding image data are described. An image is reconstructed and deblocked. A respective deblocking filter is identified for different color planes of the image. The deblocking filters may include those having different lengths for a luma plane as compared to one or more chroma planes of the image. One or more of the color planes, such as the luma plane, may have different filters for filtering reconstructed pixels vertically as compared to filtering the reconstructed pixels horizontally.

19 Claims, 9 Drawing Sheets

(56) References Cited

OTHER PUBLICATIONS

Bankoski et al., "VP8 Data Format and Decoding Guide", Independent Submission RFC 6389, Nov. 2011, 305 pp.
Bankoski et al., "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

DEBLOCKING FILTERING

CROSS-REFERENCE TO RELATED APPLICATION

This application is a continuation of U.S. patent application Ser. No. 16/016,768, filed Jun. 25, 2018, now U.S. Pat. No. 10,750,171, the content of which is incorporated herein in its entirety by reference.

BACKGROUND

Digital video streams may represent video using a sequence of frames or still images. Digital video can be used for various applications including, for example, video conferencing, high-definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

Encoding based on spatial similarities may be performed by breaking a frame or image into blocks that are predicted based on other blocks within the same frame or image. Differences (i.e., residual errors) between blocks and prediction blocks are compressed and encoded in a bitstream. A decoder uses the differences and reference frames to reconstruct the frames or images. Prediction blocks may be determined in part by using loop filtering to suppress distortion occurring at block boundaries in reconstructed images.

SUMMARY

This application relates to encoding and decoding video or other images. Disclosed herein are aspects of systems, methods, and apparatuses for performing deblocking filtering using variable filter levels or strengths, which may be selected independently for different color planes of an image (e.g., a frame of video). In some implementations, different filter levels may be selected for application at horizontal block boundaries and for application at vertical block boundaries within a color plane.

One aspect of the disclosed implementations is a system for encoding video. The system includes a memory and a processor. The memory stores instructions executable by the processor to cause the system to: access an image including multiple color planes; encode the image in an encoded bitstream; determine a first filter level based on a first color plane of the image, wherein the first filter level specifies one or more thresholds that are used to select a length for a deblocking filter; determine a second filter level based on a second color plane of the image, wherein the second filter level specifies one or more thresholds that are used to select a length for a deblocking filter; encode the first filter level and the second filter level in the encoded bitstream; after reconstruction of the image, apply a deblocking filter to the first color plane using the first filter level; and, after reconstruction of the image, apply a deblocking filter to the second color plane using the second filter level.

Another aspect is a method for decoding video. The method includes: accessing an encoded bitstream; reconstructing an image including multiple color planes based on data from the encoded bitstream; decoding a first filter level from the encoded bitstream, wherein the first filter level specifies one or more thresholds that are used to select a length for a deblocking filter; decoding a second filter level from the encoded bitstream, wherein the second filter level specifies one or more thresholds that are used to select a length for a deblocking filter; after reconstruction of the image, applying a deblocking filter to a first color plane of the image using the first filter level; and, after reconstruction of the image, applying a deblocking filter to a second color plane of the image using the second filter level.

Another aspect is a system for decoding video. The system includes a memory and a processor. The memory stores instructions executable by the processor to cause the system to: access an encoded bitstream; reconstruct an image including multiple color planes based on data from the encoded bitstream; decode a first filter level from the encoded bitstream, wherein the first filter level specifies one or more thresholds that are used to select a length for a deblocking filter; decode a second filter level from the encoded bitstream, wherein the second filter level specifies one or more thresholds that are used to select a length for a deblocking filter; after reconstruction of the image, apply a deblocking filter to a first color plane of the image using the first filter level; and, after reconstruction of the image, apply a deblocking filter to a second color plane of the image using the second filter level.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
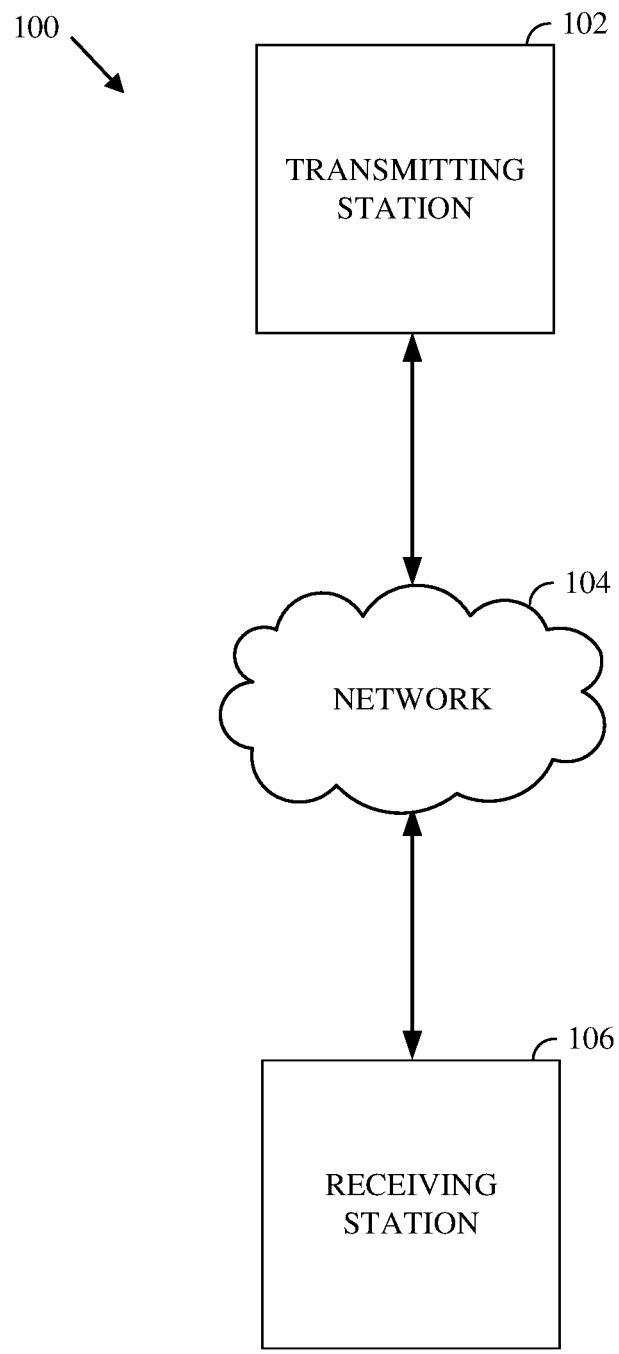
FIG. 1 is a schematic of a video encoding and decoding system.

Transform coding is one of the key components of video codecs. Intra- or inter-predicted residuals are coded using kernel transforms such that most valuable signals are condensed onto low frequencies. Following a transform step, quantization takes place on transformed domain to achieve compression, which introduces signal loss as tradeoff. When quantized signal is transformed back into spatial domain, signal loss may lead to pixel inhomogeneity. Specifically, for block-based modern codecs, such inhomogeneity will be highlighted on block boundaries, leading to unpleasant visual effect caught by human eyes. The visual effect is well known as a blocking artifact. An in-loop deblocking filter, also commonly referred as a loop filter, may be highly effective in reducing blocking artifact by applying low pass filtering perpendicular across block boundaries as a processing stage employed after the frame reconstruction. As a coding tool, it enhances coding performance and more importantly, it significantly improves visual quality of videos by reducing blocking artifact. A key to deblocking filter is finding proper filters and filter levels, which control the filtering strength, such that the filtering reduces blocking artifacts while avoiding blurring true edges. Systems and methods are disclosed herein that enable a codec to select appropriate deblocking filter strengths for luminance and chrominance planes for video coding. For example, these approaches for selecting of deblocking filter levels/strengths may utilize the fact that luminance and chrominance planes have different coding properties and further, horizontal and vertical directions within the same plane may also show different characteristics with respect to filtering.

In a traditional deblocking filter scheme, Luminance (Y) and chrominance (U, V) planes share the same filter level. However one filter level per frame may not fully explore the potentials of current design of deblocking filter. By considering coding complexity and performance tradeoff, a filter strength selection procedure may be decomposed into multiple steps. Instead of one filter level per frame for all color planes, a first search may be performed separately for the appropriate filter strength/levels for a luminance color plane and a chrominance color plane. In some implementations, horizontal and vertical filter level searches may be decomposed only for Y color plane, and best filter levels may be picked. Experimental results have shown that this deblocking filtering technique may improve the coding performance of a loop filter, without extra complexity for a decoder. On one example test set, Peak Signal-to-Noise Ratio (PSNR) gains are 0.08% on low-resolution, 0.20% on midres, 0.33% on hdres, and 0.64% on screen content. On an example AWCY high latency, object-1-fast test set, PSNR gains for Y, Cb, Cr are 0.04%, 2.14%, and 1.91%, respectively. Because of better filtering in chrominance planes, the overall visual quality may be improved as well.

A set of thresholds may be predefined in the codec. The thresholds may be used to control how much non-flatness is allowed in order to perform the deblocking filter. The encoder may select an index from the threshold set, here we call it filter level that provides a good tradeoff between deblocking and content texture preservation. The selected index (e.g., the optimal index) is related to the content texture as well as the quantization step size. In general, a coarser quantization would benefit from a higher non-flatness threshold, since larger quantization step size leads to higher pixel distortions. While content texture that contains strong contrast and details may benefit from lower non-flatness thresholds. For a given image (e.g., frame of video), filter levels are determined and a loop filter initializes thresholds of non-flatness. For example, for a given image, a codec (e.g., an AV1 codec) first searches for an appropriate filter strengths/levels for a luminance and chrominance color planes separately at the encoder side.

The selection criteria of filter level may be based on the sum of squared error (SSE) between a source image and corresponding reconstructed image. The encoder may start from guessing a filter level and computing corresponding SSE for the image. The fitting filter level may be found using a modified binary search approach. Instead of minimizing SSE, a penalty term may be added in the search to prevent the encoder selecting a large filter level. The design principle is that if only minimizing SSE, the encoder may tend to overly smooth the signal. While the encoding performance for current image may achieve a local maximum in terms of PSNR, the selected filter level may blur the current image, which impacts motion search and compensation in future frames of video, leading to degradation of overall performance. The penalty term may be determined based on image content and fine-tuned for the codec (e.g., the AV1 codec). First, instead of using one filter level for all color planes, independent filter levels for luminance and chrominance planes (Y, U, V) may be searched and selected. The new design is based on the observation that luminance and chrominance planes have different characteristics. In modern video coding standards, color images are represented in luminance and chrominance channels to take advantage of the human visual system's lower acuity for color differences than for luminance. Chrominance planes are often sub-sampled resulting in different size than the luminance plane. And in general, the encoding performance of chrominance planes is better than the luminance plane in terms of PSNR, which is also true in AV1 codec. Better coded chrominance planes could have less blocking artifacts than a luminance plane. Hence, chrominance planes may effectively use less deblocking filtering. Performance may be improved relative to the use of a single filter level for all color planes. The encoder may search and pick fitting filter levels for the Y, U, V planes independently. A decoder may receive filter levels via a bitstream. Then deblocking filter may applied for Y, U, V separately, with potentially different filter levels. Second, a filter level search for horizontal and vertical direction for luminance plane (Y) may be separated resulting in potentially different filter levels for vertical and horizontal filtering in a given color plane. This design is premised on the realization that the content texture may possess different characteristics in vertical and horizontal directions, whereas the quantization is generally applied in the 2-D space. For example, an individual non-flatness factor may be used for each direction. In some implementations, horizontal and vertical searches are performed only for the luminance (Y) plane. This implementation may be particularly useful where the variance in each of the horizontal and vertical direction is not large enough to provide sufficient gains to cover the overhead cost in bitstream for chrominance (U and V) planes. Also, a search process for the encoder may be reduced. Independent search on horizontal and vertical directions for U, V planes may also be implemented in some cases. There may not be significant improvement in terms of coding gain. Thus the light implementation may be preferred.

The selection process of filter levels can be summarized as follows. For an encoder, the appropriate filter level for the Y, U, V planes are separately searched and found, denoted as Ly, Lu, Lv. For the Y plane, appropriate filter levels are searched for horizontal and vertical directions, denoted as Ly_h, Ly_v: Let Ly_h=Ly_v=Ly (e.g., set the initial filter levels for the horizontal and vertical directions equal to each other). Then fix the filter level for the vertical direction Ly_v at the initial filter level, and search and find a new, updated filter level for the horizontal direction Ly_h that provides the best solution. Then, fix the filter level for the horizontal directed Ly_h at the updated filter level, and search and a find new, updated filter level for the vertical direction Ly_v. A deblocking filter for each plane is separately applied, using selected filter levels. In the bitstream, Ly_h, Ly_v, Lu, Lv are transmitted. For a decoder, the selected filter levels are read, and the deblocking filters are applied accordingly.

As used herein, the term "luminance" refers to a color plane representing brightness in an image. For example, a luminance color plane may reflect relative luminance (e.g., Y) or a weighted sum of gamma-compressed R'G'B' components (e.g., Y', sometimes called luma).

This approach may have several advantages over other methods. For example, performance of a deblocking filter may be improved in terms of encoding efficiency and/or visual quality. These improvements may be achieved without adding substantial extra complexity for a decoder implementation. These improvements may be achieved with a modest increase in computational complexity for an encoder implementation.

Details are described herein after first describing an environment in which the improved image processing for compression disclosed herein may be implemented.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
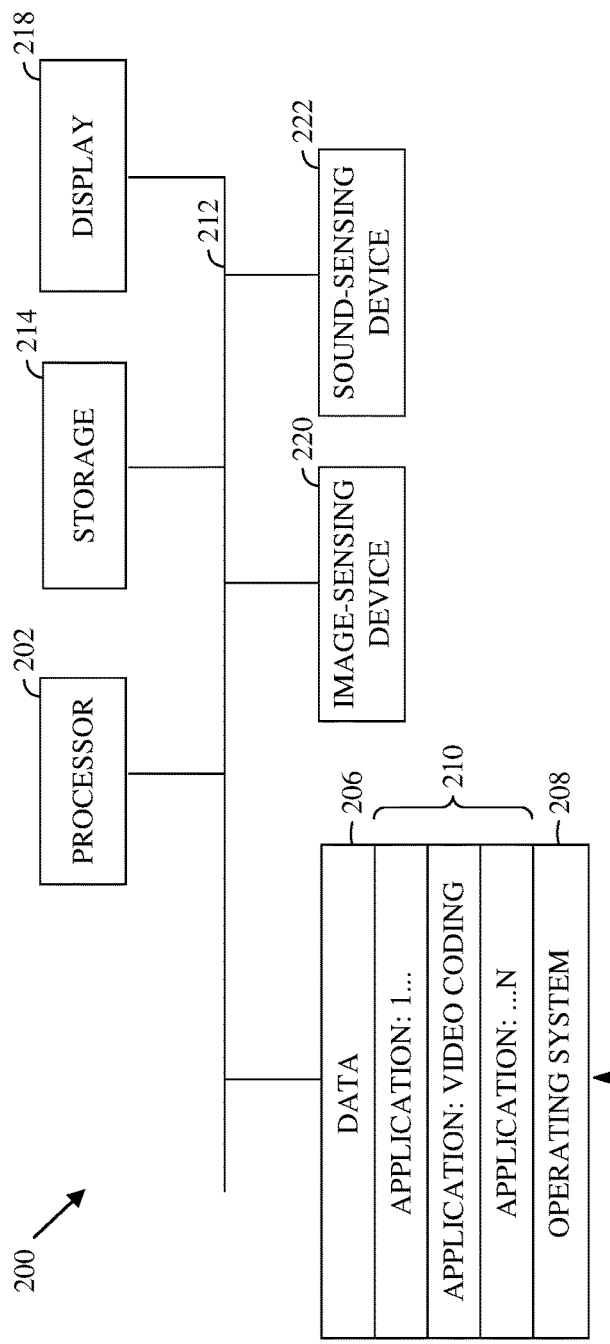
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hyper-Text Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
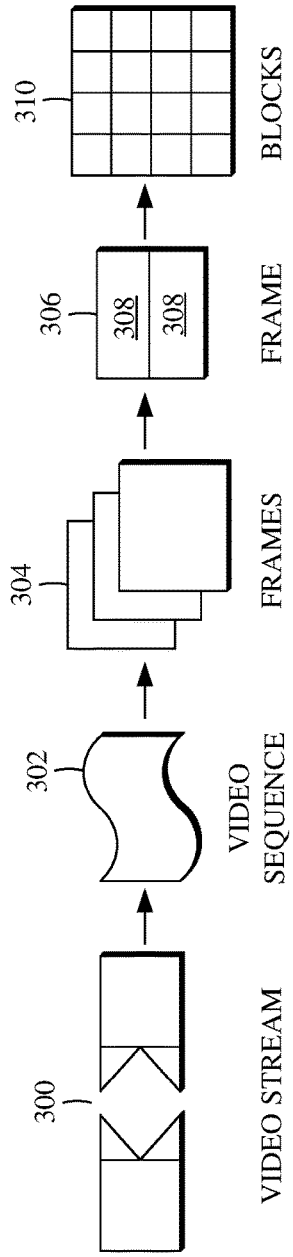
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. In some cases, a frame may be referred to as a picture. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, 4×32 pixels, 8×32 pixels, 16×32 pixels, 32×4 pixels, 32×8 pixels, 32×16 pixels, 32×32 pixels, 64×64 pixels, or in general N×M pixels, where N, M may be an integer power of 2 like 2, 4, 8, 16, 32, 64, 128, 256, or larger.

Figure 4:
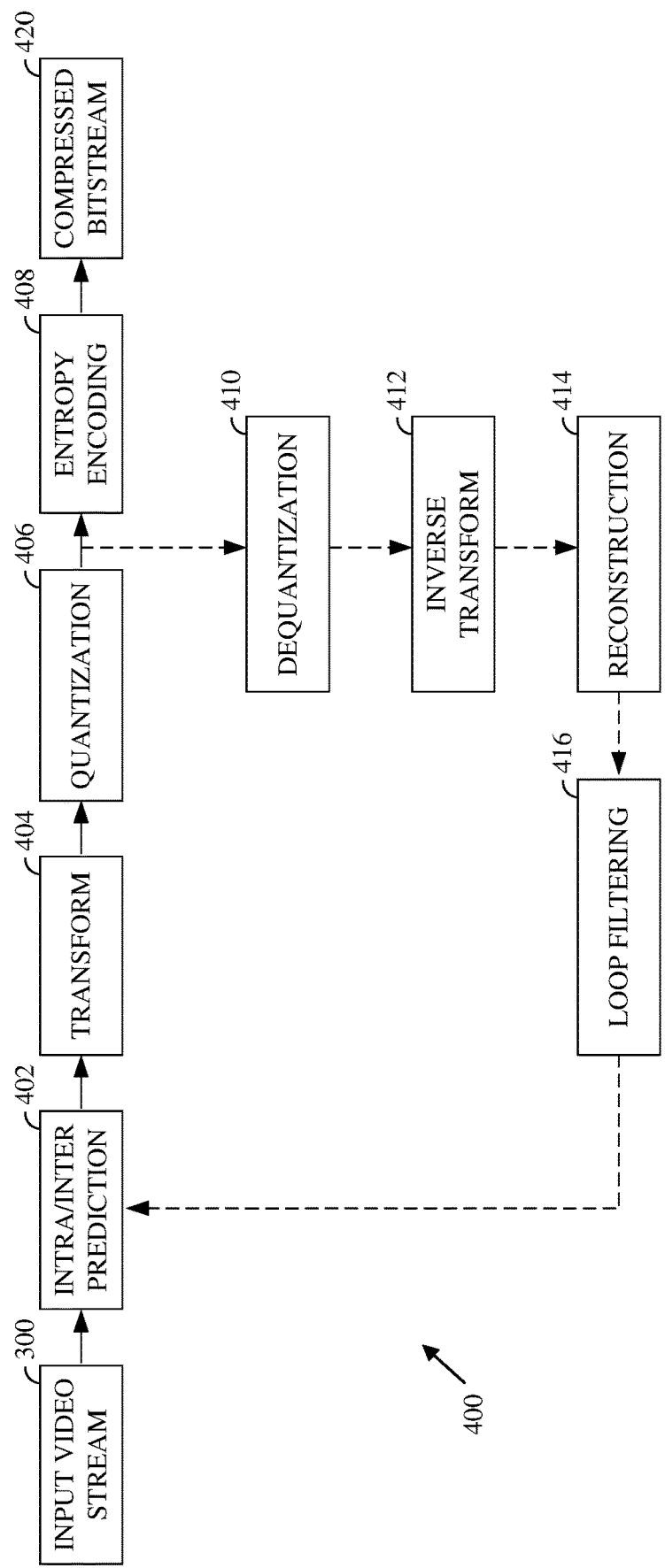
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination of both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms (e.g., identity transform, transpose, rotation, and Karhunen-Loève transform (KLT)) are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts. For example, the loop filtering stage 416 may apply the deblocking filter 600 of FIG. 6 to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage.

Figure 5:
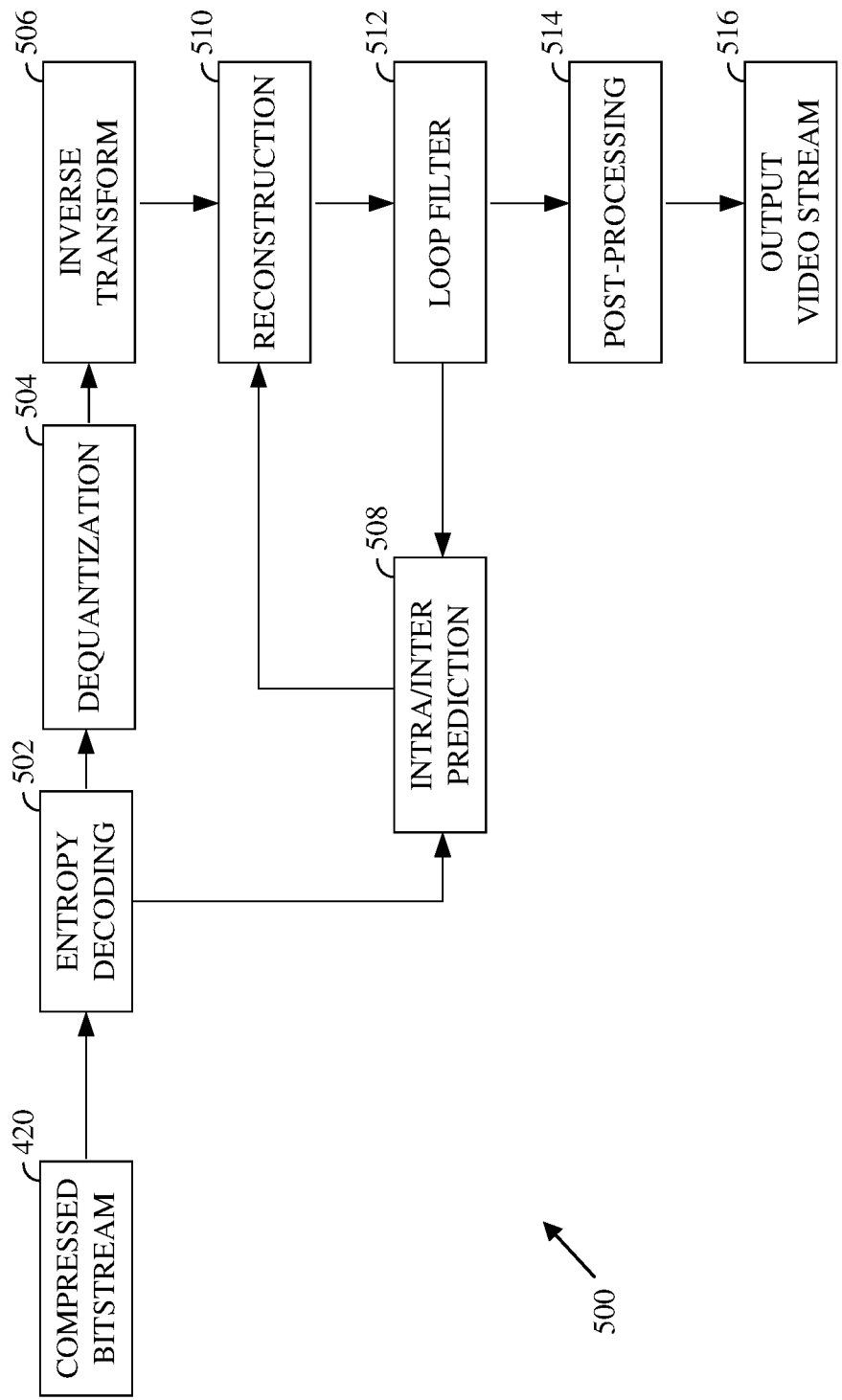
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described herein. The decoder 500 can also be implemented in hardware included in, for example, the transmitting station 102 or the receiving station 106. The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a post-processing stage 514 (e.g., including deblocking filtering). Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. In some implementations, the loop filtering stage 512 may apply the deblocking filter 600 of FIG. 6 to the reconstructed block to reduce distortion such as blocking artifacts. Other filtering can be applied to the reconstructed block. In this example, the deblocking filtering is applied by the post-processing stage 514 to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the post-processing stage 514. In some implementations of the decoder 500, the post-processing stage 514 (e.g., including deblocking filtering) is applied before the loop filtering stage 512. Additionally, or alternatively, the encoder 400 includes a deblocking filtering stage (e.g., using the deblocking filter 600) in addition to the loop filtering stage 416.

Figure 6:
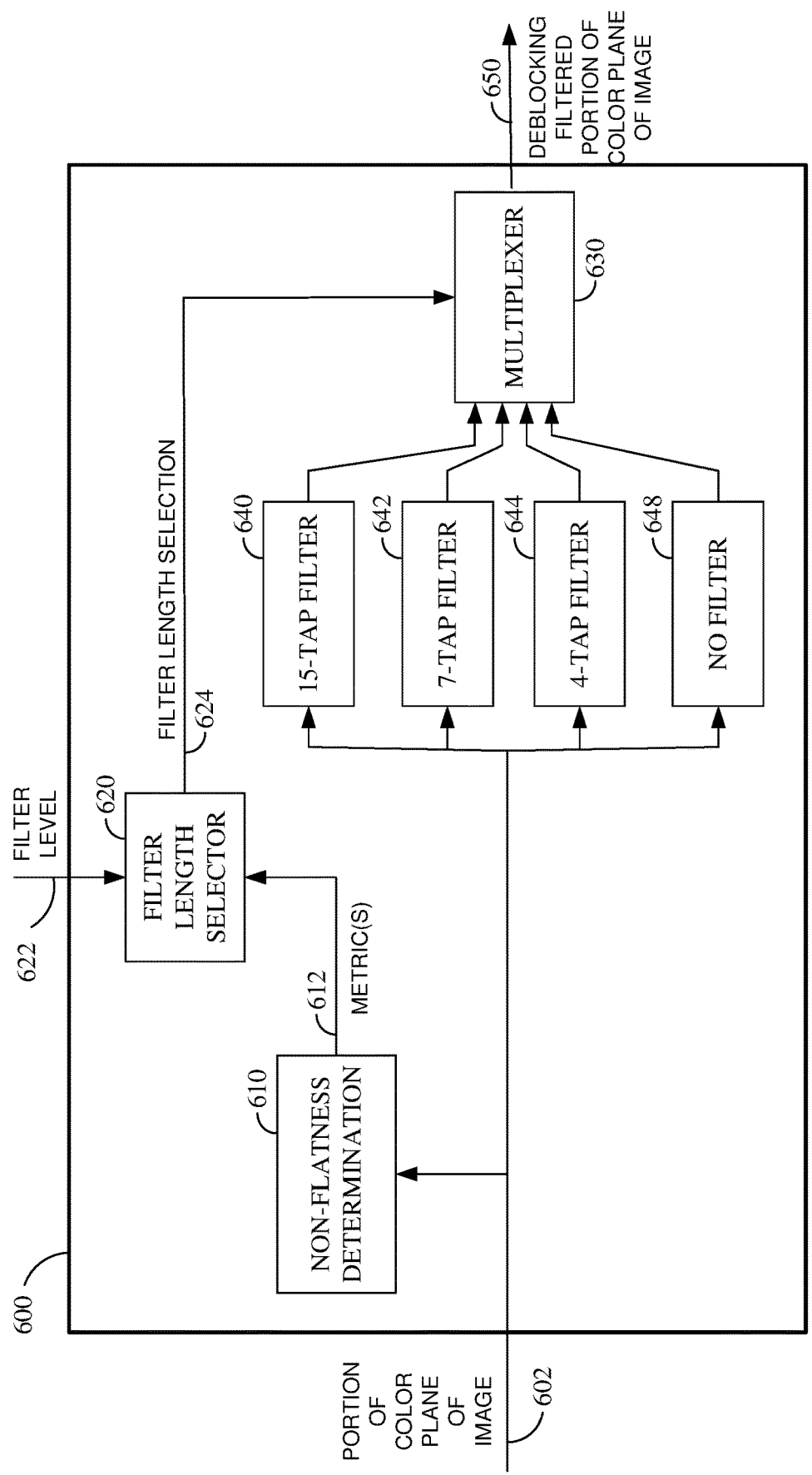
FIG. 6 is a block diagram of an example of a deblocking filter.

FIG. 6 is a block diagram of an example of a deblocking filter 600. The deblocking filter 600 may be applied to a portion 602 of a color plane of an image that is input to the deblocking filter in order to reduce blocking artifacts near a block boundary of the image. For example, the portion 602 of the color plane may be a line of pixels of the color plane crossing the block boundary. For example, the portion 602 of the color plane may be the portion 700 of FIG. 7. The deblocking filter 600 includes a non-flatness determination module 610, a filter length selector 620, a multiplexer 630, and multiple filters (640, 642, 646, and 648) with different filter lengths. The deblocking filter 600 may be applied to many portions 602 of color planes of an image along various block boundaries of the image to implement deblocking filtering for the image. A filter level 622 may be input to the deblocking filter 600 to adjust a filter length selection process by specifying one or more thresholds that are used to select a filter (e.g., 640, 642, 646, or 648) for a given portion 602 of a color plane. For example, the deblocking filter 600 may implement the process 1000 of FIG. 10. For example, the filter level 622 may depend on which color plane the portion 602 is from and/or whether the portion 602 crosses a vertical block boundary or a horizontal block boundary. For example, the deblocking filter 600 may be implemented in an encoder as part of the loop filtering stage 416. For example, the deblocking filter 600 may be implemented in a decoder as part of the loop filtering stage 512.

The non-flatness determination module 610 determines one or more non-flatness metrics 612 based on the portion 602. For example, the one or more non-flatness metrics 612 may include a maximum magnitude of a difference between pairs of pixels on a first side of a block boundary. For example, the one or more non-flatness metrics 612 may also include a maximum magnitude of a difference between pairs of pixels on a second side of a block boundary. For example, the one or more non-flatness metrics 612 may include an average of magnitudes of differences between pairs of pixel values at corresponding pixel locations reflected across a block boundary. The one or more non-flatness metrics 612 may include metrics determined for various subsets of the portion 602 corresponding to available filter lengths (e.g., the 15-tap filter 640, the 7-tap filter 642, or the 4-tap filter 644).

The filter length selector 620 takes as input the one or more non-flatness metrics 612 and a filter level 622 that is applicable to the portion 602 and determines a filter length selection 624. The filter level 622 may specify one or more thresholds for the one or more non-flatness metrics 612 that are used to implement selection criteria to select a filter from among the available filters (640, 642, 646, and 648) that will be applied to the portion 602 to obtain a corresponding deblocking filtered portion 650 of the color plane of the image. For example, a selection criteria may compare one or more non-flatness metrics 612 for a subset of the portion corresponding to a candidate filter length to one or respective more respective thresholds specified by the filter level 622. In some implementations, the longest available filter for which all corresponding non-flatness metrics 612 are less than the respective thresholds specified by the filter level 622 may be selected for application to the portion 602. In some cases, the criteria may not be met for any of the non-zero length filters (e.g., the 15-tap filter 640, the 7-tap filter 642, and the 4-tap filter 644) available, and instead no filter 648 (i.e., a 0-tap filter) may be selected, resulting in the portion 602 being passed through to the output of the deblocking filter 600 unmodified.

In this example, the multiplexer 630 selects the deblocking filtered portion 650 from the selected filter (e.g., the 15-tap filter 640, the 7-tap filter 642, the 4-tap filter 644, or no filter 648) for output from the deblocking filter 600 based on the filter length selection 624. In some implementations (not shown in FIG. 6), other filter lengths may be available, such as a 6-tap filter, an 8-tap filter, a 14-tap filter, and/or a 16-tap filter.

Figure 7:
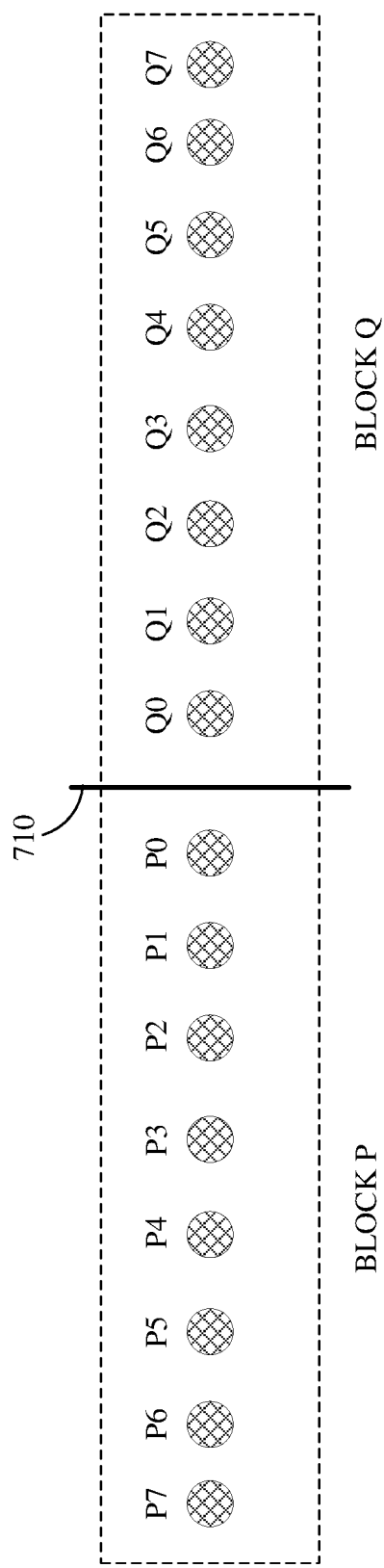
FIG. 7 is an illustration of an example of a portion of a color plane near a block boundary that is subject to deblocking filtering.

FIG. 7 is an illustration of an example of a portion 700 of a color plane near a block boundary that is subject to deblocking filtering. The portion 700 includes a line of fourteen pixels; labeled P7, P6, . . . P0, Q0, Q1, . . . Q7; that crosses a block boundary 710 between a first block, labeled Block P, of the image from a second block, labeled Block Q, of the image. The pixels are part of a color plane (e.g., a luminance color plane or a chrominance color plane) of the image. In some implementations, the pixels may be from a down-sampled version of the color plane, which may or may not correspond to the full resolution version of the image. Thus a pixel value may be representative of multiple pixel values in a higher resolution version of the color plane of the image. Note that the number portion of the pixel label in FIG. 7 corresponds to a distance from the block boundary 710, thus two pixels labeled in different blocks labeled with the same number constitute a pair of pixel values at corresponding pixel locations reflected across the block boundary 710. For example, a deblocking filter (e.g., the deblocking filter 600) may be applied to modify the portion 700 by determining weighted averages of values for pixels within a range of the block boundary 710 that depends on a selected filter length.

For example, a filter length that will be used for the portion 700 may be selected based on evaluation of criteria for one or more non-flatness metrics for the portion 700 that depend in part of one or more thresholds for these metrics that are specified by a filter level that may be encoded in a bitstream and used by a decoder and/or by an encoder as part of loop filtering. An example of a selection criteria is given by the equations EQ 1, EQ2, EQ3, and EQ 4 below:

$$NF(P)=\max(|Pi-Pj|), \text{ for } i<N, j<N \quad [EQ1]$$

$$NF(Q)=\max(|Qi-Qj|), \text{ for } i<N, j<N \quad [EQ2]$$

$$D=N^{-1}\Sigma_{k=0}^{N-1}|Pk-Qk| \quad [EQ3]$$

$$(NF(P)<T\_1)\&\&(NF(Q)<T\_1)\&\&(D<T\_2) \quad [EQ4]$$

where i, j, and k are integer indices; N is half the filter length of a candidate filter of a deblocking filter; and T_1 and T_2 are thresholds specified by a filter level for the applicable to the color plane of the portion 700 and/or applicable to the orientation of the block boundary 710 in the image. In some implementations, the longest available candidate filter that satisfies the criteria of EQ 4 may be selected for application to the portion 700.

Figure 8:
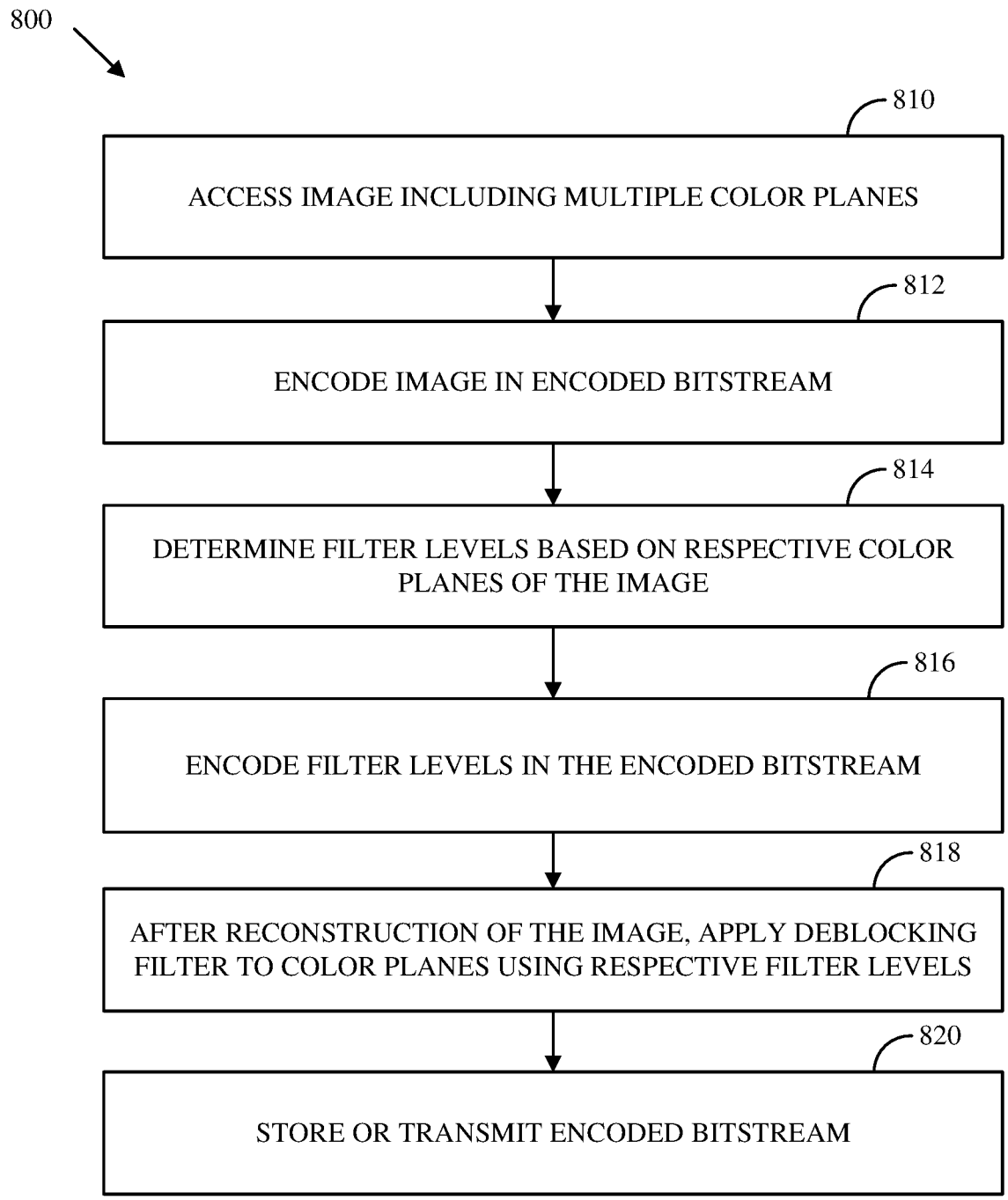
FIG. 8 is a flowchart of an example of a process for encoding images using multiple filter levels for respective color planes.

FIG. 8 is a flowchart of an example of a process 800 for encoding images using multiple filter levels for respective color planes. The process 800 includes accessing 810 an image including multiple color planes; encoding 812 the image in an encoded bitstream; determining 814 filter levels based on respective color planes of the image; encoding 816 the filter levels in the encoded bitstream; after reconstruction of the image, applying 818 a deblocking filter to the color planes using respective filter levels; and storing or transmitting 820 the encoded bitstream. For example, the process 800 may be implemented using a memory and a processor, wherein the memory stores instructions executable by the processor. For example, the process 800 may be implemented by the computing device 200 of FIG. 2. For example, the process 800 may be implemented by the transmitting station 102 of FIG. 1. For example, the process 800 may be implemented by the encoder 400 of FIG. 4.

The process 800 includes accessing 810 an image (e.g., a frame of video or a still image) including multiple color planes. In some implementations, the image includes three color planes (e.g., RGB or YUV). For example, image may include a first color plane that is a luminance color plane and a second color plane that is a chrominance color plane. For example, the image may also include a third color plane, which may be another chrominance color plane. The image may be accessed 810 in variety of ways. For example, the image may be accessed 810 by reading directly from an image sensor (e.g., of the image-sensing device 220) or from a memory (e.g., the memory 204 or the secondary storage 214) via an interconnect (e.g., via the bus 212). For example, the image may be accessed 810 by receiving image data via a communications link (e.g., a wireless communications link).

The process 800 includes encoding 812 the image in an encoded bitstream. For the techniques described in relation to the encoder 400 of FIG. 4 may be used to encode 812 the image in a bitstream (e.g., the compressed bitstream 420).

The process 800 includes determining 814 filter levels based on respective color planes of the image. For example, the filter levels for two different color planes are determined 814 independently of each other. In some implementations, determining 814 the filter levels includes determining 814 a first filter level based on a first color plane (e.g., a luminance plane) of the image, wherein the first filter level specifies one or more thresholds that are used to select a length for a deblocking filter; and determining 814 a second filter level based on a second color plane (e.g., a chrominance plane) of the image, wherein the second filter level specifies one or more thresholds that are used to select a length for a deblocking filter. In some implementations, determining 814 the filter levels includes determining 814 a third filter level based on a third color plane (e.g., another chrominance plane) of the image, wherein the third filter level specifies one or more thresholds that are used to select a length for a deblocking filter.

The filter levels may be represented in a variety of formats. For example, the filter level may be a quantized threshold for a non-flatness metric. In some implementations, the filter level is an index to a table or codebook with entries that includes a set of one or more thresholds that are used to select a length for a deblocking filter. For example, one of the filter levels may be determined 814 by searching for the filter level using a criterion based on a sum of square errors between a source version of the corresponding color plane and a loop-filtered reconstructed version of the corresponding color plane. In some implementations, a modified binary search may be used to determine 814 one of the filter levels. For example, a criterion for the search may sum of square errors with a penalty term added, where the penalty term may be proportional to the filter level, which may correspond to higher thresholds and a tendency toward the application of deblocking filters with longer filter lengths. For example, a search for filter level may proceed according to:
Suppose a current filter level is L, a previous best filter level is L0, a sum of squared error of the current filter level and the previous best level are S and S0, and a bias term is B. A criteria may be: If S+B<S0, then update best filter level as L0=L
The bias term B may be designed such that there is a tendency to select a lower filter level. For example:

$$B=\text{filter\_step}*(S0/(2^{(15-L/8)})). \quad [EQ5]$$

Filter_step may also be related to L. Filter_step may depend on iterations and the range of L. For example, typical values are 2, 4, 6, or 8.

In some applications, different filter levels may be determined 814 for vertical block boundaries and horizontal block boundaries within a given color plane. For example, a first filter level and a second filter level may be determined 814 based on the first color plane of the image, wherein the first and the second filter levels specify one or more thresholds that are used to select a length for a deblocking filter. The first filter level may be for vertical filtering and a deblocking filter may be applied 818 vertically across horizontal block boundaries of the first color plane using the first filter level, while the second filter level may be for horizontal filtering and a deblocking filter may be applied 818 horizontally across vertical block boundaries of the first color plane using the second filter level. For example, determining 814 the first (vertical) filter level and the second (horizontal) filter level may include determining an initial filter level for the first color plane as a whole and initializing the vertical filter level and the horizontal filter level to this initial value; fixing the vertical filter level while searching to find a new horizontal filter level that provides a good value for a criterion (e.g., sum of square error and/or with penalty term for filter level); and fixing the horizontal filter level at the new value while searching to find a new vertical filter level that provides a good value for a criterion (e.g., sum of square error and/or with penalty term for filter level). For example, a separate vertical filter levels and horizontal filter levels may be determined 814 for each of multiple color planes (e.g., for each of the three YUV color planes). In some implementations, a separate vertical filter level and horizontal filter level are determined 814 for a luminance color plane, while only a single filter level is determined for one or more chrominance color planes.

The process 800 includes encoding 816 the filter levels (e.g., a first filter level and a second filter level) in the encoded bitstream. For example, the filter levels may be encoded 816 by inserting the filter levels or data based on the filter levels in the bitstream (e.g., the compressed bitstream 420). For example, the filter levels may be encoded 816 using the entropy encoding stage 408 of FIG. 4. For example, the filter levels may include a horizontal filter level for a luminance color plane (e.g., a Y color plane), a vertical filter level for the luminance color plane (e.g., the Y color plane), a filter level for a first chrominance color plane (e.g., a U color plane), and a filter level for a second chrominance color plane (e.g., a V color plane); and these filter levels may be encoded 816 with 6 bits each (24 bits total) that constitute codebook indices to a codebook storing sets of one or more thresholds for non-flatness measures.

The process 800 includes, after reconstruction of the image, applying 818 a deblocking filter (e.g., the deblocking filter 600 of FIG. 6) to the color planes using respective filter levels. For example, after reconstruction of the image, a deblocking filter may be applied 818 to a first color plane (e.g., a luminance color plane) using a first filter level; and, after reconstruction of the image, a deblocking filter may be applied 818 to a second color plane (e.g., a chrominance color plane) using the second filter level. The deblocking filters applied 818 to different color planes may be the same or different (i.e., a single deblocking filter may be reused for different color planes or multiple different deblocking filters may be respectively applied 818 to different color planes). In some implementations, after reconstruction of the image, a deblocking filter may be applied 818 to a third color plane (e.g., another chrominance color plane) using a third filter level. In some implementations, where separate vertical and horizontal filter levels have been determined 814 for a color plane (e.g., a luminance color plane), after reconstruction of the image, a deblocking filter may be applied 818 horizontally across vertical block boundaries of the color plane using the horizontal filter level and a deblocking filter may be applied 818 vertically across horizontal block boundaries of the color plane using the vertical filter level. In some implementations, where separate vertical and horizontal filter levels have been determined 814 for multiple color planes, after reconstruction of the image, a deblocking filter may be applied 818 horizontally across vertical block boundaries of a second color plane (e.g., a chrominance color plane) using the vertical filter level and a deblocking filter may be applied 818 vertically across horizontal block boundaries of the second color plane using the vertical filter level. In some implementations, the one or more thresholds of a filter level (e.g., the first filter level) are compared to a non-flatness metric for a portion of a color plane (e.g., the first color plane) near a block boundary (e.g., the portion 700 of FIG. 7). For example, the non-flatness metric may include an average of magnitudes of differences between pairs of pixel values at corresponding pixel locations reflected across the block boundary. For example, a deblocking filter may be applied 818 to a color plane by implementing the process 1000 of FIG. 10 to process portions of the color plane.

The process 800 includes storing or transmitting 820 the encoded bitstream. For example, the encoded bitstream may be stored 820 in the secondary storage 214 or the memory 204. For example, the encoded bitstream may be transmitted 820 via a network interface from the transmitting station 102, through the network 104, to the receiving station 106.

Figure 9:
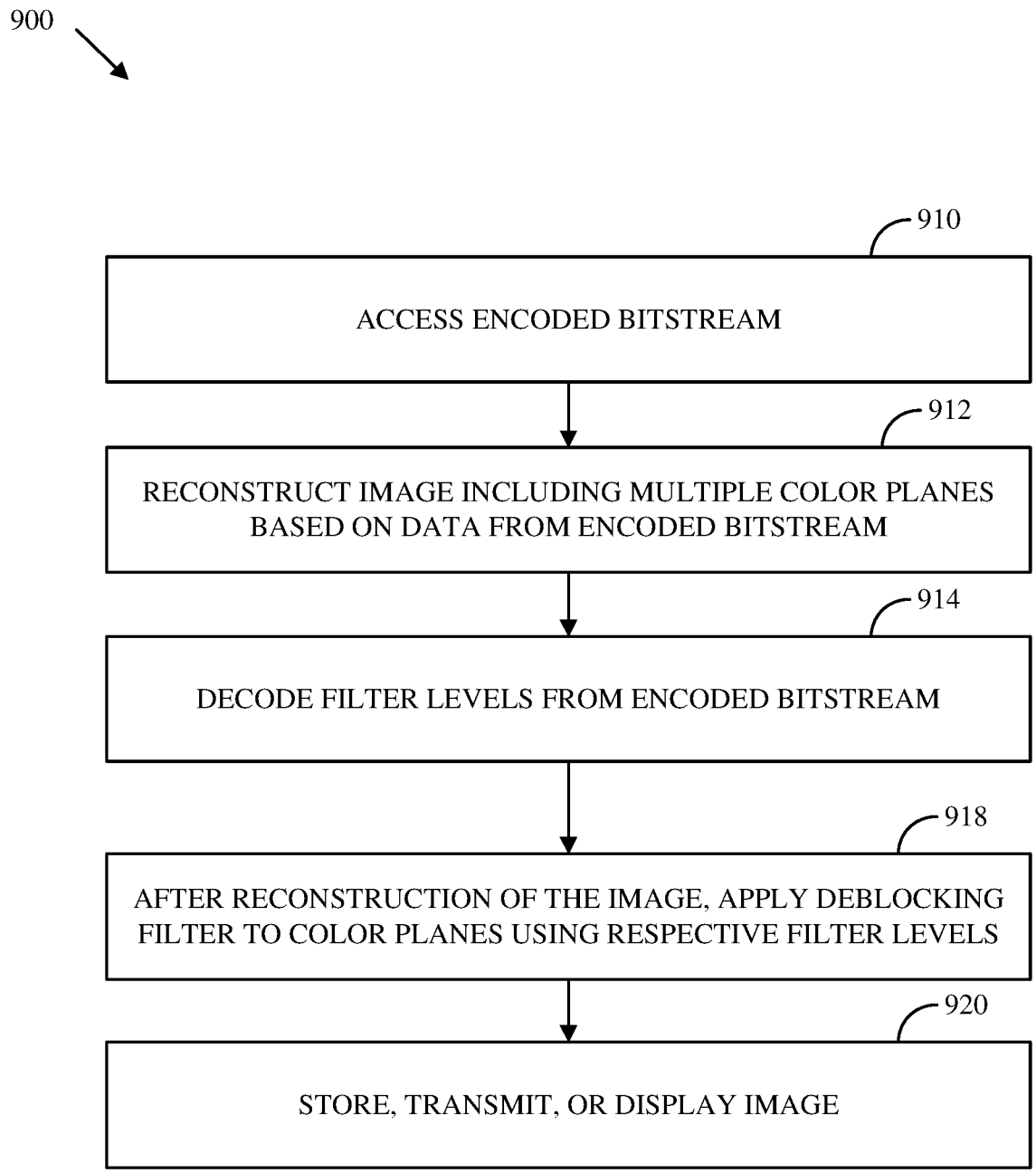
FIG. 9 is a flowchart of an example of a process for decoding images using multiple filter levels for respective color planes.

FIG. 9 is a flowchart of an example of a process 900 for decoding images using multiple filter levels for respective color planes. The process 900 includes accessing 910 an encoded bitstream; reconstructing 912 an image including multiple color planes based on data from the encoded bitstream; decoding 914 filter levels from the encoded bitstream; after reconstruction of the image, applying 918 a deblocking filter to multiple color planes of the image using respective filter levels for those color planes; and storing, transmitting, or displaying 920 the image. For example, the process 900 may be implemented using a memory and a processor, wherein the memory stores instructions executable by the processor. For example, the process 900 may be implemented by the computing device 200 of FIG. 2. For example, the process 900 may be implemented by the receiving station 106 of FIG. 1. For example, the process 900 may be implemented by the decoder 500 of FIG. 5.

The process 900 includes accessing 910 an encoded bitstream (e.g., the compressed bitstream 420). The bitstream may be accessed 910 in variety of ways. For example, the bitstream may be accessed 910 by reading from a memory (e.g., the memory 204 or the secondary storage 214) via an interconnect (e.g., via the bus 212). For example, the bitstream may be accessed 910 by receiving image data via a communications link (e.g., a wireless communications link).

The process 900 includes reconstructing 912 an image (e.g., a frame of video or a still image) including multiple color planes based on data from the encoded bitstream. In some implementations, the image includes three color planes (e.g., RGB or YUV). For example, image may include a first color plane that is a luminance color plane and a second color plane that is a chrominance color plane. For example, the image may also include a third color plane, which may be another chrominance color plane. For example, the image may be reconstructed 912 using techniques described in relation to the decoder 500 of FIG. 5, including techniques described in relation to the reconstruction stage 510.

The process 900 includes decoding 914 multiple filter levels from the encoded bitstream. For example, decoding 914 the multiple filter levels may include decoding 914 a first filter level (e.g., for a luminance color plane) from the encoded bitstream. The first filter level may specify one or more thresholds that are used to select a length for a deblocking filter. Decoding 914 the multiple filter levels may also include decoding 914 a second filter level (e.g., for a chrominance color plane) from the encoded bitstream. The second filter level may specify one or more thresholds that are used to select a length for a deblocking filter. In some implementations, decoding 914 the filter levels includes decoding 914 a third filter level (e.g., for another chrominance color plane) from the encoded bitstream. The third filter level may specify one or more thresholds that are used to select a length for a deblocking filter.

The filter levels may be represented in a variety of formats. For example, the filter level may be a quantized threshold for a non-flatness metric. In some implementations, the filter level is an index to a table or codebook with entries that includes a set of one or more thresholds that are used to select a length for a deblocking filter. For example, the filter levels may be decoded 914 by parsing the bitstream (e.g., the compressed bitstream 420) to read the filter levels or data based on the filter levels. For example, the filter levels may be decoded 914 using the entropy decoding stage 502 of FIG. 5. For example, the filter levels may include a horizontal filter level for a luminance color plane (e.g., a Y color plane), a vertical filter level for the luminance color plane (e.g., the Y color plane), a filter level for a first chrominance color plane (e.g., a U color plane), and a filter level for a second chrominance color plane (e.g., a V color plane); and these filter levels may be decoded 914 with 6 bits each (24 bits total) that constitute codebook indices to a codebook storing sets of one or more thresholds for non-flatness measures.

In some applications, different filter levels may be decoded 914 for vertical block boundaries and horizontal block boundaries within a given color plane. For example, a first filter level and a second filter level may be decoded 914 for a first color plane of the image (e.g., a luminance color plane), wherein the first and the second filter levels specify one or more thresholds that are used to select a length for a deblocking filter. The first filter level may be for vertical filtering and a deblocking filter may be applied 918 vertically across horizontal block boundaries of the first color plane using the first filter level, while the second filter level may be for horizontal filtering and a deblocking filter may be applied 918 horizontally across vertical block boundaries of the first color plane using the second filter level. For example, a separate vertical filter levels and horizontal filter levels may be decoded 914 for each of multiple color planes (e.g., for each of the three YUV color planes). In some implementations, a separate vertical filter level and horizontal filter level are decoded 914 for a luminance color plane, while only a single filter level is decoded 914 for one or more chrominance color planes.

The process 900 includes, after reconstruction of the image, applying 918 a deblocking filter (e.g., the deblocking filter 600 of FIG. 6) to the color planes using respective filter levels. For example, after reconstruction of the image, a deblocking filter may be applied 918 to a first color plane (e.g., a luminance color plane) of the image using the first filter level; and, after reconstruction of the image, a deblocking filter may be applied 918 to a second color plane (e.g., a chrominance color plane) of the image using the second filter level. The deblocking filters applied 918 to different color planes may be the same or different (i.e., a single deblocking filter may be reused for different color planes or multiple different deblocking filters may be respectively applied 918 to different color planes). In some implementations, after reconstruction of the image, a deblocking filter may be applied 918 to a third color plane (e.g., another chrominance color plane) using a third filter level. In some implementations, where separate vertical and horizontal filter levels have been decoded 914 for a color plane (e.g., a luminance color plane), after reconstruction of the image, a deblocking filter may be applied 918 horizontally across vertical block boundaries of the color plane using the horizontal filter level and a deblocking filter may be applied 918 vertically across horizontal block boundaries of the color plane using the vertical filter level. In some implementations, where separate vertical and horizontal filter levels have been decoded 914 for multiple color planes, after reconstruction of the image, a deblocking filter may be applied 918 horizontally across vertical block boundaries of a second color plane (e.g., a chrominance color plane) using the vertical filter level and a deblocking filter may be applied 918 vertically across horizontal block boundaries of the second color plane using the vertical filter level. In some implementations, the one or more thresholds of a filter level (e.g., the first filter level) are compared to a non-flatness metric for a portion of a color plane (e.g., the first color plane) near a block boundary (e.g., the portion 700 of FIG. 7). For example, the non-flatness metric may include an average of magnitudes of differences between pairs of pixel values at corresponding pixel locations reflected across the block boundary. For example, a deblocking filter may be applied 918 to a color plane by implementing the process 1000 of FIG. 10 to process portions of the color plane.

The process 900 includes storing, transmitting, or displaying 920 the image (e.g., a frame of video or a still image). For example, the image may be stored 920 in the secondary storage 214 or the memory 204. For example, the image may be transmitted 920 via a network interface from the receiving station 106 through the network 104. For example, the image may be displayed 920 in the display 218.

Figure 10:
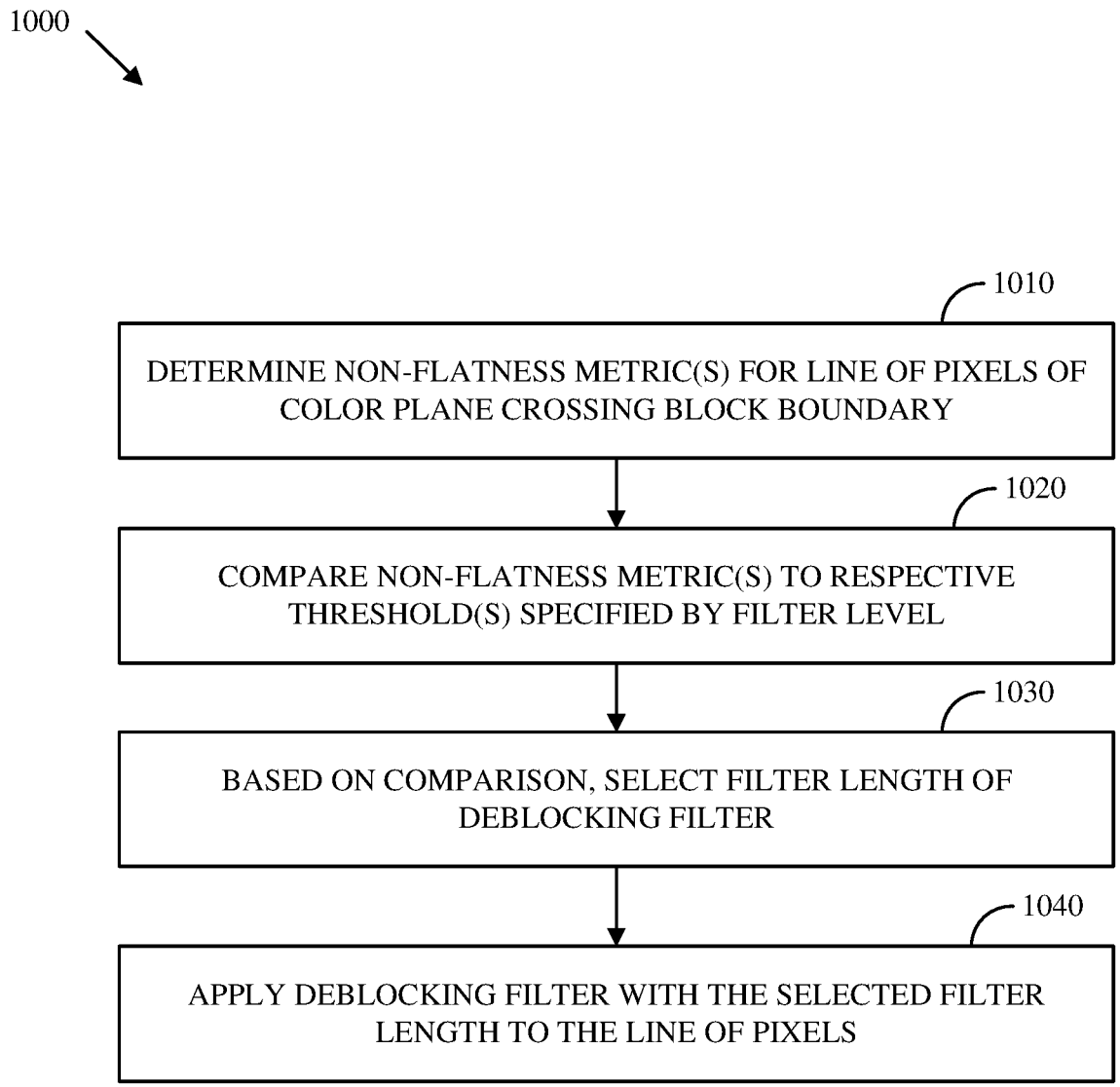
FIG. 10 is a flowchart of an example of a process for applying a deblocking filter to a portion of a color plane crossing a block boundary of an image.

FIG. 10 is a flowchart of an example of a process 1000 for applying a deblocking filter to a portion of a color plane crossing a block boundary of an image. The process 1000 includes determining 1010 one or more non-flatness metrics for a line of pixels of a color plane crossing a block boundary; comparing 1020 the one or more non-flatness metrics to one or more respective thresholds specified by a filter level; based on the comparison, selecting 1030 a filter length of a deblocking filter; and applying 1040 the deblocking filter with the selected filter length to the line of pixels. For example, the process 1000 may be implemented using a memory and a processor, wherein the memory stores instructions executable by the processor. For example, the process 1000 may be implemented by the computing device 200 of FIG. 2. For example, the process 1000 may be implemented by the transmitting station 102 and/or the receiving station 106 of FIG. 1. For example, the process 1000 may be implemented by the encoder 400 of FIG. 4. For example, the process 1000 may be implemented by the decoder 500 of FIG. 5. For example, the process 1000 may be implemented by the deblocking filter 600 of FIG. 6.

The process 1000 includes determining 1010 one or more non-flatness metrics for a line of pixels (e.g., the portion 700 of FIG. 7) of a color plane crossing the block boundary. For example, the one or more non-flatness metrics may include the metrics NF(P), NF(Q), and D of EQ1, EQ2, and EQ3. In some implementations, the one or more non-flatness metrics include an average of magnitudes of differences between pairs of pixel values at corresponding pixel locations reflected across the block boundary.

The process 1000 includes comparing 1020 the one or more non-flatness metrics to one or more respective thresholds specified by a filter level. For example, the one or more non-flatness metrics may be compared 1020 to a set of thresholds as described in EQ4.

The process 1000 includes, based on the comparison (1020), selecting 1030 a filter length of a deblocking filter. For example, the filter length may be selected 1030 using a multiplexer, as described in relation to FIG. 6. For example, the filter length may be selected 1030 by executing software for only one of the candidate filters of a deblocking filter (e.g., the deblocking filter 600 of FIG. 6).

The process 1000 includes applying 1040 the deblocking filter with the selected filter length to the line of pixels (e.g., the portion 700 of FIG. 7). In some implementations, the process 1000 may be repeated at each pixel location along a block boundary in first color plane of the image.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a computer or processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for encoding image data, comprising:
a processor configured to:
 access an image including multiple color planes;
 encode, into an encoded bitstream, an image including multiple color planes by encoding at least a first color plane and a second color plane of the multiple color planes;
 determine a length of a first deblocking filter for the first color plane of the image, wherein the first deblocking filter comprises a first vertical filter and a first horizontal filter, and the first vertical filter is different from the first horizontal filter;
 determine a length of a second deblocking filter for the second color plane of the image, wherein the second deblocking filter comprises a second vertical filter and a second horizontal filter, and the second vertical filter and the second horizontal filter share a single filter level;
 reconstruct the encoded image;
 apply the first deblocking filter to a portion of the first color plane of the reconstructed image; and
 apply the second deblocking filter to a portion of the second color plane of the reconstructed image.

2. The apparatus of claim 1, wherein to apply the first deblocking filter comprises to:
 apply the first vertical filter across horizontal block boundaries; and
 apply the first horizontal filter across vertical block boundaries.

3. The apparatus of claim 1, wherein the first color plane is a luminance color plane and the second color plane is a chrominance color plane.

4. The apparatus of claim 1, where the processor is configured to determine the length of the first deblocking filter independent of determining the length of the second deblocking filter.

5. An apparatus for decoding image data, comprising:
a processor configured to:
 reconstruct, from an encoded bitstream, an image including multiple color planes, comprising:
  decoding, from the encoded bitstream, residual data of at least a first color plane and a second color plane of the multiple color planes; and
  reconstructing the at least the first color plane and the second color plane of the multiple color planes;
 determine a length of a first deblocking filter for the first color plane of the image, wherein the first deblocking filter comprises a first vertical filter applied vertically across horizontal block boundaries and a first horizontal filter applied horizontally across vertical block boundaries, and the first vertical filter is different from the first horizontal filter;
 determine a length of a second deblocking filter for the second color plane of the image, wherein the second deblocking filter comprises a second vertical filter and a second horizontal filter, the second vertical filter and the second horizontal filter share a single filter level, and the length of the second deblocking filter is different from the length of the first deblocking filter;
 apply the first deblocking filter to a portion of the first color plane of the reconstructed image; and
 apply the second deblocking filter to a portion of the second color plane of the reconstructed image.

6. The apparatus of claim 5, wherein the processor is configured to:
 determine the length of the first deblocking filter for the first color plane of the image using first information encoded within the encoded bitstream; and
 determine the length of the second deblocking filter for the second color plane of the image using second information encoded within the encoded bitstream.

7. The apparatus of claim 5, where the processor is configured to determine the length of the first deblocking filter independent of determining the length of the second deblocking filter.

8. The apparatus of claim 5, wherein:
 the multiple color planes of the image include a third color plane;
 to reconstruct the image comprises to:
  decode, from the encoded bitstream, residual data of the third color plane of the multiple color planes; and
  reconstruct the third color plane of the multiple color planes; and
 the processor is configured to:
  determine a length of a third deblocking filter for the third color plane of the image, wherein the length of the third deblocking filter is different from the length of the first deblocking filter; and
  apply the third deblocking filter to the third color plane of the reconstructed image.

9. The apparatus of claim 8, wherein the processor is configured to:
 determine the length of the first deblocking filter for the first color plane of the image using a first deblocking filter level encoded within the encoded bitstream; and
 determine the length of the second deblocking filter for the second color plane of the image using a second deblocking filter level encoded within the encoded bitstream.

10. The apparatus of claim 8, where the processor is configured to determine the length of the first deblocking filter independent of determining the length of the second deblocking filter.

11. The apparatus of claim 7, where the processor is configured to determine the length of the first deblocking filter independent of determining the length of the second deblocking filter.

12. A method for decoding image data, comprising:
reconstructing, from an encoded bitstream, an image including multiple color planes, comprising:
 decoding, from the encoded bitstream, residual data of at least a first color plane and a second color plane of the multiple color planes; and
 reconstructing the at least the first color plane and the second color plane of the multiple color planes;
determining a length of a first deblocking filter for the first color plane of the image, wherein the first deblocking filter comprises a first vertical filter and a first horizontal filter, and the first vertical filter is different from the first horizontal filter;
determining a length of a second deblocking filter for the second color plane of the image, wherein second deblocking filter comprises a second vertical filter and a second horizontal filter, and the second vertical filter and the second horizontal filter share a single filter level;

applying the first deblocking filter to a portion of the first color plane of the reconstructed image; and applying the second deblocking filter to a portion of the second color plane of the reconstructed image.

13. The method of claim 12, wherein applying the first deblocking filter comprises:

applying the first vertical filter across horizontal block boundaries; and applying the first horizontal filter across vertical block boundaries.

14. The method of claim 13, wherein determining the length of the first deblocking filter is independent of determining the length of the second deblocking filter.

15. The method of claim 12, wherein:

the multiple color planes of the image include a third color plane;

reconstructing the image comprises:

decoding, from the encoded bitstream, residual data of the third color plane of the multiple color planes; and reconstructing the third color plane of the multiple color planes; and the method further comprises:

determining a length of a third deblocking filter for the third color plane of the image, wherein the length of the third deblocking filter is different from the length of the first deblocking filter; and applying the third deblocking filter to the third color plane of the reconstructed image.

16. The method of claim 15, wherein applying the first deblocking filter comprises:

applying the first vertical filter across horizontal block boundaries; and applying the first horizontal filter across vertical block boundaries.

17. The method of claim 16, wherein determining the length of the first deblocking filter is independent of determining the length of the second deblocking filter.

18. The apparatus of claim 5, wherein the processor is configured to:

determine the length of the first deblocking filter for the first color plane of the image using a first deblocking filter level encoded within the encoded bitstream; and determine the length of the second deblocking filter for the second color plane of the image using a second deblocking filter level encoded within the encoded bitstream.

19. The apparatus of claim 1, wherein the first color plane of this image is the luma plane and to determine the length of the first deblocking filter for the first color plane of the image comprises to:

set an initial filter level for a horizontal direction equal to an initial filter level for a vertical direction;

determine an updated filter level for the horizontal direction while fixing a filter level for the vertical direction at the initial filter level; and determine an updated filter level for the vertical direction while fixing a filter level for the horizontal directed at the updated filter level for the horizontal direction, wherein the first deblocking filter level comprises the updated filter level for the horizontal direction and the updated filter level for the vertical direction.

* * * * *